(12) United States Patent
Isaiah (10) Patent No.: US 10,650,382 B2
(45) Date of Patent: May 12, 2020

(54) SYSTEMS AND METHODS FOR DETECTING FRAUDULENT USE OF A SERIAL CODE FOR ACCESSING AN ASSOCIATED VALUE STORED ON A NETWORK

(71) Applicant: nSure.ai Payment Assurance Ltd., Tel-Aviv (IL)

(72) Inventor: Ziv Isaiah, Tel-Aviv (IL)

(73) Assignee: nSure.ai Payment Assurance Ltd., Tel-Aviv (IL)

( * ) Notice: Subject to any disclaimer, the term of this patent is extended or adjusted under 35 U.S.C. 154(b) by 429 days.

(21) Appl. No.: 15/695,132

(22) Filed: Sep. 5, 2017

(65) Prior Publication Data
US 2019/0073677 A1    Mar. 7, 2019

(51) Int. Cl.
*G06Q 20/40* (2012.01)
*G06F 21/60* (2013.01)
*G06Q 20/20* (2012.01)
*H04W 12/12* (2009.01)

(52) U.S. Cl.
CPC ......... *G06Q 20/4018* (2013.01); *G06F 21/60* (2013.01); *G06Q 20/20* (2013.01); *H04W 12/12* (2013.01)

(58) Field of Classification Search
CPC .................................................... G06Q 20/34
See application file for complete search history.

(56) References Cited

U.S. PATENT DOCUMENTS

| | | | | |
|---|---|---|---|---|
| 7,325,726 B2* | 2/2008 | Jennings, Jr. | .......... | G06Q 20/20 235/379 |
| 7,447,303 B1* | 11/2008 | Moneymaker | .......... | H04M 3/42 379/207.13 |
| 2004/0068437 A1* | 4/2004 | McGee | .................. | G06Q 30/02 705/14.38 |
| 2008/0179394 A1* | 7/2008 | Dixon | .................. | G06Q 20/027 235/380 |
| 2009/0254480 A1* | 10/2009 | Esslinger | ............... | G06Q 20/40 705/44 |

(Continued)

OTHER PUBLICATIONS

Parks, Liz. Dunham, Ken. "Battling the Bots". National Retail Federation. Aug. 2017 (Year: 2017).*

(Continued)

*Primary Examiner* — Abhishek Vyas
*Assistant Examiner* — Abdulmajeed Aziz (57) ABSTRACT

There is provided a method, comprising: receiving a serial code and an associated value, accessing a first database storing active serial codes each associated with an active value, wherein the first database is accessed for each received serial code when the serial code is active and when the serial code is inactive, and the first database is accessed for each received serial code when the associated value is active and when the associated value is inactive, when no match is found, accessing a second database storing invalid serial codes each associated with an invalid value, matching the received serial code to a certain invalid serial code, and providing the invalid value associated with the certain invalid serial code, wherein a client terminal is unable to distinguish between the provided invalid value and an active value otherwise returned for a positive match between the serial code and the active serial codes.

11 Claims, 4 Drawing Sheets

(56) References Cited

U.S. PATENT DOCUMENTS

| | | | |
|---|---|---|---|
| 2011/0057025 A1* | 3/2011 | Denzer | G06Q 20/20 235/375 |
| 2012/0078739 A1* | 3/2012 | Maraz | G06Q 20/202 705/21 |
| 2015/0278801 A1* | 10/2015 | Friedlander | G06Q 20/18 705/41 |
| 2016/0232480 A1* | 8/2016 | Erez | G06Q 10/087 |
| 2017/0177902 A1* | 6/2017 | McClintock | G06F 21/60 |
| 2017/0193503 A1* | 7/2017 | Oppenheim | G06Q 20/401 |
| 2017/0323283 A1* | 11/2017 | Todasco | G06Q 20/3433 |

OTHER PUBLICATIONS

Westelius "GiftGhostBot Attacks Ecommerce Gift Card Systems Across Major Online Retailers", Distil Networks, 8 P., Aug. 9, 2017.
European Search Report and the European Search Report dated Jan. 30, 2019 From the European Patent Office Re. Application No. 18192794.8. (9 Pages).

* cited by examiner

SYSTEMS AND METHODS FOR DETECTING FRAUDULENT USE OF A SERIAL CODE FOR ACCESSING AN ASSOCIATED VALUE STORED ON A NETWORK

BACKGROUND

The present invention, in some embodiments thereof, relates to network fraud detection and, more specifically, but not exclusively, to systems and methods for detecting fraudulent use of a serial code in a network.

Credentials are provided to access an associated value stored on a network. For example, balances remaining on issued gift cards may be checked by users accessing a web site over a network. The user enters the gift card number and is presented with the remaining balance. Malicious entities try to locate gift card numbers that have remaining balances on them in order to obtain and use the balance for their own use. A particular problem arises when bots perform an automated attack over the network, in which a large number of gift card numbers (e.g., on the order of millions) are entered with the goal of identifying which are valid and have remaining balances. Current fraud-fighting paradigms try to utilize standard methods to stop such attacks, by blocking specific IP addresses (or ranges) that have previously been associated with such attacks, and/or limit the number of retries a specific user (e.g., bot) is able to make. However, such methods may be easily overcome by malicious entities, for example, by masking the fraud traces using browser-cookie deletion, and IP address changes.

This kind of fraud not only harms the user who owns the gift card (i.e., balance) that is stolen, but also puts heavy costs on the retailers for their balance-check as each such an inquiry has a cost (e.g., charged by the gift card processor handling the inquiry).

SUMMARY OF THE INVENTION

According to a first aspect, a computer implemented method of detecting fraudulent use of a serial code for accessing an associated value stored on a network, comprises: receiving by a computing system, from a client terminal via a network, a serial code and a request to obtain a value associated with the serial code, accessing a first database storing a plurality of active serial codes each associated with an active value, wherein the first database is accessed for each received serial code when the serial code is active and when the serial code is inactive, and the first database is accessed for each received serial code when the associated value is active and when the associated value is inactive, when no match is found between the received serial code and the plurality of active serial codes stored in the first database, accessing a second database storing a plurality of invalid serial codes each associated with an invalid value, matching the received serial code to a certain invalid serial code of the plurality of invalid serial codes stored in the second database, and providing, to the client terminal via the network, the invalid value stored in association with the matched certain invalid serial code, wherein the client terminal is unable to distinguish between the provided invalid value and an active value otherwise returned for a positive match between the serial code and the plurality of active serial codes.

According to a second aspect, a system for detecting fraudulent use of a serial code for accessing an associated value stored on a network, comprises: a non-transitory memory having stored there a code for execution by at least one hardware processor of a computing system, the code comprising: code for receiving by a computing system, from a client terminal via a network, a serial code and a request to obtain a value associated with the serial code, code for accessing a first database storing a plurality of active serial codes each associated with an active value, wherein the first database is accessed for each received serial code when the serial code is active and when the serial code is inactive, and the first database is accessed for each received serial code when the associated value is active and when the associated value is inactive, code for determining when no match is found between the received serial code and the plurality of active serial codes stored in the first database, and code for accessing a second database storing a plurality of invalid serial codes each associated with an invalid value, code for matching the received serial code to a certain invalid serial code of the plurality of invalid serial codes stored in the second database, and code for providing, to the client terminal via the network, the invalid value stored in association with the matched certain invalid serial code, wherein the client terminal is unable to distinguish between the provided invalid value and an active value otherwise returned for a positive match between the serial code and the plurality of active serial codes.

According to a third aspect, a computer program product for detecting fraudulent use of a serial code for accessing an associated value stored on a network, comprises: a non-transitory memory having stored there a code for execution by at least one hardware processor of a computing system, the code comprising: instructions for receiving by a computing system, from a client terminal via a network, a serial code and a request to obtain a value associated with the serial code, instructions for accessing a first database storing a plurality of active serial codes each associated with an active value, wherein the first database is accessed for each received serial code when the serial code is active and when the serial code is inactive, and the first database is accessed for each received serial code when the associated value is active and when the associated value is inactive, instructions for determining when no match is found between the received serial code and the plurality of active serial codes stored in the first database, and code for accessing a second database storing a plurality of invalid serial codes each associated with an invalid value, instructions for matching the received serial code to a certain invalid serial code of the plurality of invalid serial codes stored in the second database, and instructions for providing, to the client terminal via the network, the invalid value stored in association with the matched certain invalid serial code, wherein the client terminal is unable to distinguish between the provided invalid value and an active value otherwise returned for a positive match between the serial code and the plurality of active serial codes.

The systems, methods, and/or code instructions described herein operate by a mechanism that is different than honeypot and/or honeytoken based security systems. Honeypot and/or honeytoken systems attempt to deceive malicious entities by planting false data at locations in which malicious entities are expected to access, and/or planting false data at location in which no valid users are expected to access (to detect access of the false data by the malicious entities). In contrast, the systems, methods, and/or code instructions described herein process the request to obtain the value associated with the serial code in a common manner for both cases, regardless of whether the serial code originates from a legitimate user or a malicious entity.

The active database described herein is accessed when the serial code is valid and when the serial code is inactive, when the associated value is valid and when the associated valid is invalie. The invalid value provided when the serial code matches invalid serial codes is not necessarily designed to deceive the receiving client terminal into believing that valuable data has been obtained, but rather to prevent the client terminal from distinguishing between active values and inactive values, which prevents the client terminal from identifying the serials codes associated with active values. The client terminal is therefore unable to transfer or redeem or otherwise benefit from active values.

The systems, methods, and/or code instructions described herein improve an underlying technical process within the technical field of network security, for example, within the field of network fraud detection, and/or security of data stored on a network node.

The systems, methods, and/or code instructions described herein address the technical problem of securing data stored on a network node (e.g., computing device, server), in particular, to detection of a fraudulent attempt to access the data stored on the network node. The technical problem may relate to automated attempts by code executing on a client terminal (e.g., bot) applying brute-force methods to maliciously identify and obtain valid data. For example, a manual attempt(s) by a user and/or automated attempts (e.g., by a bot) to obtain balances of gift cards (e.g., from a gift card server) by trying different gift card serial numbers to identify gift cards that are still active and that have associated balances (e.g., monetary equivalent).

The systems, methods, and/or code instructions described herein may improve the performance of a computing device (e.g., gift card server) that handles requests for providing data (e.g., gift card balance) in response to provided serial codes (e.g., gift card serial number). The improvement in performance may be obtained by early detection of an attack by an automated process (e.g., bot) executing on a client terminal accessing the computing device over a network. Such attacks, for example issuing a large number of requests for the data, may utilize the available processing resources and/or memory of the computing device. Once the attack is detected, additional request for data may be ignored and/or blocked, releasing the processing resources and/or memory.

The systems, methods, and/or code instructions described herein may improve the performance of a network that provides connectivity between the client terminal that provides the serial code and a request for the associated data, and the computing device the processes the requests and provides the data. The improvement in performance may be obtained by early detection of an attack by an automated process (e.g., bot) executing on a client terminal accessing the computing device over a network. Such attacks, for example issuing a large number of requests for the data, may utilize the available network bandwidth for transmission of the requests and/or transmission of the data to the client terminal. Once the attack is detected, additional request for data may be ignored and/or blocked, releasing the network resources.

In a further implementation form of the first, second, and third aspects, the serial code includes a gift card serial number, and wherein the value includes a remaining balance associated with the gift card serial number.

In a further implementation form of the first, second, and third aspects, when no match is found between the received serial code and the plurality of invalid serial codes stored in the second database, the method further comprises and/or the system further includes code for and/or the computer program product includes additional instructions for generating an invalid value, wherein the invalid value is generated according to a distribution of valid values of valid serial codes stored in the first database, storing in the second database, the received serial code and the generated invalid value.

In a further implementation form of the first, second, and third aspects, the generated invalid value is provided to the client terminal via the network in a format that is indistinguishable to the client terminal from a provided valid value.

In a further implementation form of the first, second, and third aspects, when the serial code is received again as another request, the generated invalid value stored in the second database is provided to the requesting client terminal via the network. In a further implementation form of the first, second, and third aspects, when a match is found between the received serial code and a certain active serial code of the plurality of active serial codes stored in the first database: the method further comprises and/or the system further includes code for and/or the computer program product includes additional instructions for providing, to the client terminal via the network, the active value stored in the data field of the matched active serial code.

In a further implementation form of the first, second, and third aspects, an interface of the computing device for receiving the request and the serial code is unsecure and publicly accessible to valid users and to malicious entities for issuing requests to obtain the value associated with the serial code.

In a further implementation form of the first, second, and third aspects, an interface of the computing device for accessing the first database and the second database is secure, unavailable to public entities, and inaccessible directly by the client terminal.

In a further implementation form of the first, second, and third aspects, the first database and the second database are stored and managed as independent databases.

In a further implementation form of the first, second, and third aspects, the first database and the second database are stored and managed as a single database that further stores a flag associated with each of the plurality of serial codes indicative of whether each of the plurality of serial codes is active or invalid.

In a further implementation form of the first, second, and third aspects, the invalid value is provided to the client terminal rather than an error message indicative of invalidity of the serial code.

In a further implementation form of the first, second, and third aspects, the invalid value is provided to the client terminal via the network in a structure that is indistinguishable to the client terminal from the structure of a provided active value.

In a further implementation form of the first, second, and third aspects, the method further comprises and/or the system further includes code for and/or the computer program product includes additional instructions for generating an alert indicative of the client terminal identified as associated with malicious behavior.

In a further implementation form of the first, second, and third aspects, the method further comprises and/or the system further includes code for and/or the computer program product includes additional instructions for identifying a sequence of repeated requests provided by the client terminal using sequentially related serial codes, and ignoring additional requests from the client terminal.

In a further implementation form of the first, second, and third aspects, the sequentially related serial codes include gift card serial numbers incrementally related to one another by a common value.

In a further implementation form of the first, second, and third aspects, the serial code and the request is automatically provided by an automated malicious process executing on the client terminal performing a brute-force attack for identifying serial codes with associated active values.

In a further implementation form of the first, second, and third aspects, the code for accessing the second database and the code for matching the received serial code to the certain invalid serial code is stored by a second non-transitory memory for execution by another at least one hardware processor of a validation server, wherein the computing device accesses the validation server by a secure interface over the network.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

The present invention, in some embodiments thereof, relates to network fraud detection and, more specifically, but not exclusively, to systems and methods for detecting fraudulent use of serial code(s) in a network.

An aspect of some embodiments of the present invention relate to systems, an apparatus, methods, and/or code instructions (stored in a data storage device executable by one or more hardware processors) for providing an invalid value (optionally stored in a data field of a database of a computing device (e.g., server)) in response to a request from a client terminal via a network to obtain the value according to a serial code designated as invalid, rather than providing an error message or the real value (e.g., zero, or close to zero).

For example, the serial code includes a gift card serial number, and the request is for a value of the remaining balance. When the request is received by the computing device from the client terminal, the serial code is looked-up in an active database that stores records of active serial codes. When the received serial code is not matched to active serial codes, the received serial code is looked-up in an invalid database that stores records of invalid serial codes.

The invalid value associated with the invalid serial code is provided to the client terminal. For example a fake balance is returned, rather than returning an error stating that the provided serial code has expired, and/or rather than returning a balance of zero (or near zero). The client terminal is unable to distinguish the fake balance from a real balance, and processes the fake balance as if an active balance exists. The computing device may identify the client terminal as acting maliciously, and raise an alert and/or take appropriate action against the malicious client terminal. The client terminal may be executing malicious code, which automatically issues a larger number of requests with different serial codes in an attempt to identify which serial codes are associated with active values (e.g., which gift cards have remaining non-zero or significant balances) in order to obtain the active values.

By providing the client terminal with fake values in response to requests with invalid serial codes, the malicious code is unable to distinguish the real active serial codes from the invalid serial codes, and therefore unable to utilize the active balances, protecting the active values associated with the active serial codes. For example, when the malicious code includes instructions to identify active gift card serial numbers with non-zero balances and transfer the non-zero balances to another account, but the instead the malicious code receives invalid balances for the inactive gift card serial numbers, the malicious code may become overwhelmed in trying to transfer invalid balances from invalid serial codes and/or transfer balances of zero.

The systems, methods, and/or code instructions described herein operate by a mechanism that is different than honeypot and/or honeytoken based security systems.

Honeypot and/or honeytoken systems attempt to deceive malicious entities by planting false data at locations in which malicious entities are expected to access, and/or planting false data at location in which no valid users are expected to access (to detect access of the false data by the malicious entities). In contrast, the systems, methods, and/or code instructions described herein process the request to obtain the value associated with the serial code in a common manner for both cases, regardless of whether the serial code originates from a legitimate user or a malicious entity. The active database described herein is accessed when the serial code is valid and when the serial code is inactive, when the associated value is valid and when the associated valid is invalie.

The invalid value provided when the serial code matches invalid serial codes is not necessarily designed to deceive the receiving client terminal into believing that valuable data has been obtained, but rather to prevent the client terminal from distinguishing between active values and inactive values, which prevents the client terminal from identifying the serials codes associated with active values. The client terminal is therefore unable to transfer or redeem or otherwise benefit from active values.

The systems, methods, and/or code instructions described herein improve an underlying technical process within the technical field of network security, for example, within the field of network fraud detection, and/or security of data stored on a network node.

The systems, methods, and/or code instructions described herein address the technical problem of securing data stored on a network node (e.g., computing device, server), in particular, to detection of a fraudulent attempt to access the data stored on the network node. The technical problem may relate to automated attempts by code executing on a client terminal (e.g., bot) applying brute-force methods to maliciously identify and obtain valid data. For example, a manual attempt(s) by a user and/or automated attempts (e.g., by a bot) to obtain balances of gift cards (e.g., from a gift card server) by trying different gift card serial numbers to identify gift cards that are still active and that have associated balances (e.g., monetary equivalent).

The systems, methods, and/or code instructions described herein may improve the performance of a computing device (e.g., gift card server) that handles requests for providing data (e.g., gift card balance) in response to provided serial codes (e.g., gift card serial number). The improvement in performance may be obtained by early detection of an attack by an automated process (e.g., bot) executing on a client terminal accessing the computing device over a network. Such attacks, for example issuing a large number of requests for the data, may utilize the available processing resources and/or memory of the computing device. Once the attack is detected, additional request for data may be ignored and/or blocked, releasing the processing resources and/or memory.

The systems, methods, and/or code instructions described herein may improve the performance of a network that provides connectivity between the client terminal that provides the serial code and a request for the associated data, and the computing device the processes the requests and provides the data. The improvement in performance may be obtained by early detection of an attack by an automated process (e.g., bot) executing on a client terminal accessing the computing device over a network. Such attacks, for example issuing a large number of requests for the data, may utilize the available network bandwidth for transmission of the requests and/or transmission of the data to the client terminal. Once the attack is detected, additional request for data may be ignored and/or blocked, releasing the network resources.

The systems and/or methods described herein generate new data, which may be presented to the user within an interface (e.g., graphical user interface (GUI)) associated with the client terminal and/or stored in a database associated with the computing device, in the form of the invalid data associated with the provided serial code, for example, the invalid balance associated with the provided gift card serial number. The invalid data (e.g., invalid balance) is structurally similar to active data (e.g., a valid balance of an active gift card), and is transmitted to the client terminal using a common format used to transmit the active data, such that the invalid data is indistinguishable from active data to the client terminal (e.g., to the bot and/or human user performing the attack).

The systems and/or methods described herein provide a unique, particular, and advanced technique of identifying a malicious attempt to obtain data associated with serial code, for example, a malicious attempt to obtain a balance of a gift card serial number. In particular, a unique, particular, and advanced technique of identifying an automated malicious attack (e.g., by a bot) based on brute-force methods.

Accordingly, the systems and/or methods described herein are inextricably tied to computer technology, to overcome an actual technical problem arising in fraud detection and/or security of networks and/or computing devices (e.g., a server) hosting a database storing data.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures.

For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
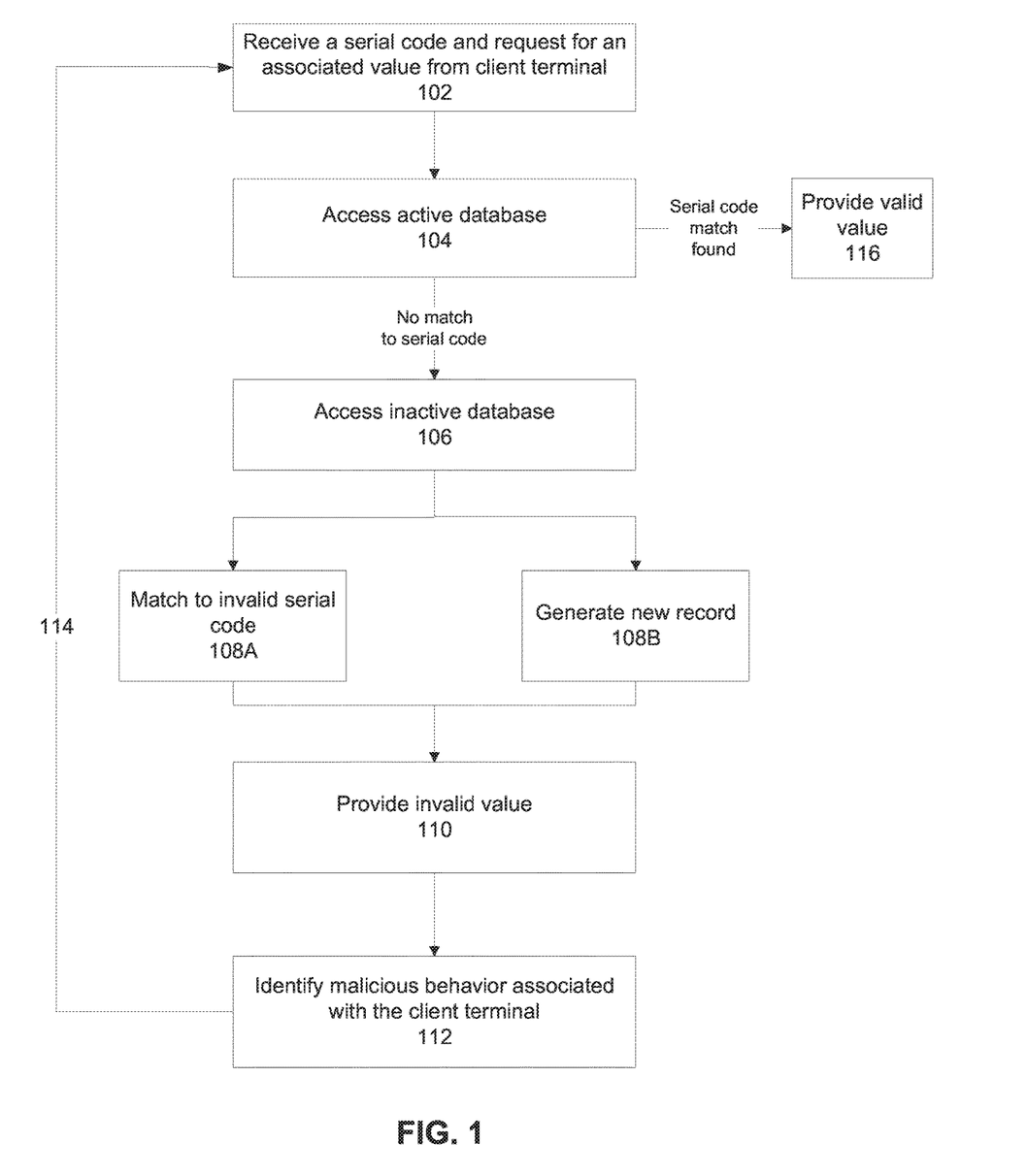
FIG. 1 is a flowchart of a process of detecting fraudulent use of a serial code for accessing an associated value stored on a network by providing an invalid value when an invalid serial code is provided, in accordance with some embodiments of the present invention.
Figure 2:
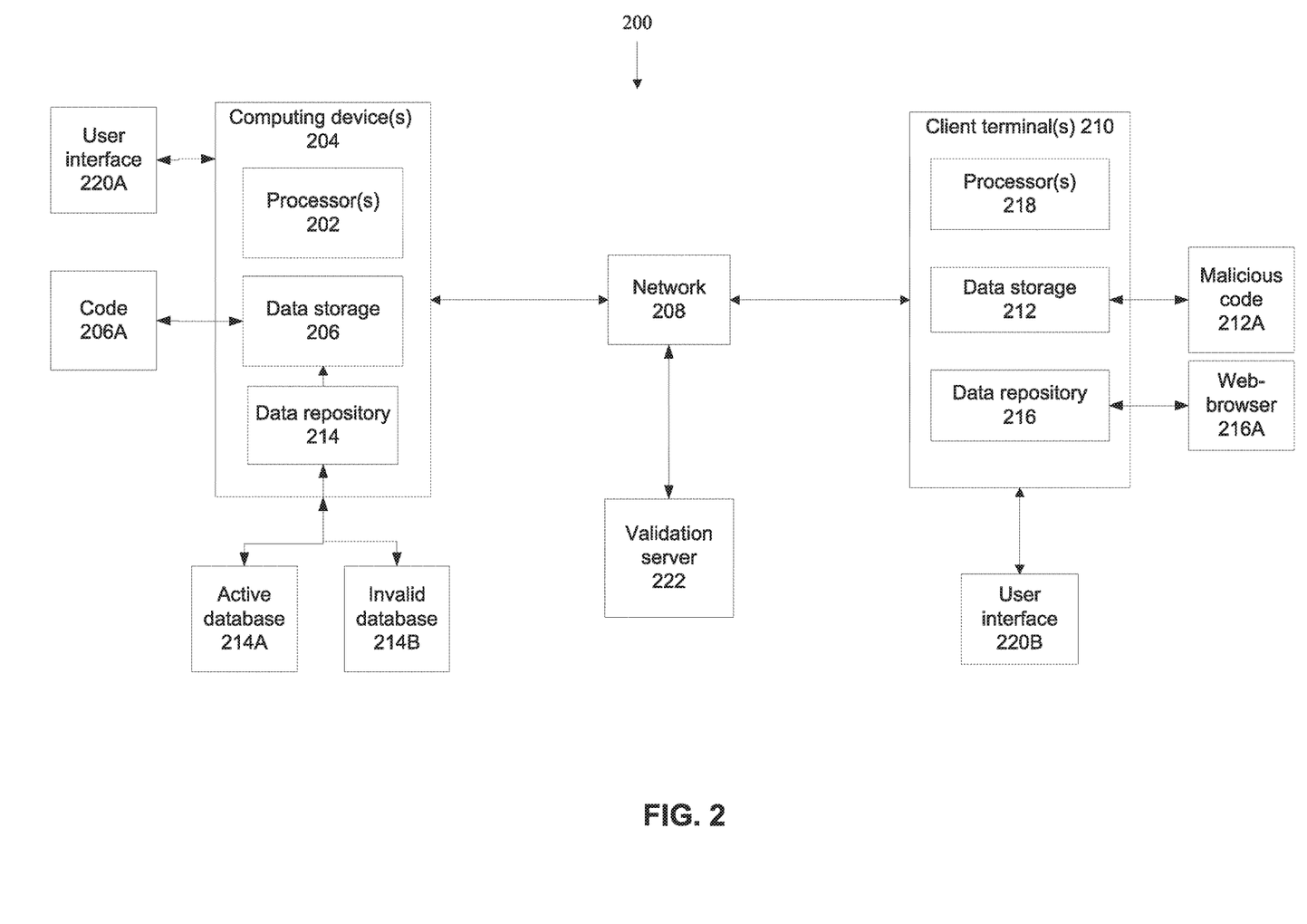
FIG. 2 is a block diagram of components of a system for detecting fraudulent use of a serial code for accessing an associated value stored on a network by providing an invalid value when an invalid serial code is provided, in accordance with some embodiments of the present invention.

Reference is now made to FIG. 1, which is a flowchart of a process of detecting fraudulent use of a serial code for accessing an associated value stored on a network by providing an invalid value when an invalid serial code is provided, in accordance with some embodiments of the present invention. Reference is also made to FIG. 2, which is a block diagram of components of a system 200 for detecting fraudulent use of a serial code for accessing an associated value stored on a network by providing an invalid value when an invalid serial code is provided, in accordance with some embodiments of the present invention. System 200 may execute the acts of the method described with reference to FIG. 1, for example, by one or more processors 202 of a computing device 204 that execute code instructions 206A stored in a data storage device 206. System 200 and/or the method of FIG. 1 improve network security of computing device 204 and/or network 208, by detecting malicious attempts to access data (e.g., gift card balance) by a client terminal 210, optionally by malicious code 212A performing a brute-force automated attack.

Computing device 204 includes and/or is associated with a data repository 214 storing an active database 214A that include active records of active serial codes (e.g., gift card serial numbers, gift card pins, user identification codes, which may include numbers and/or alphabet characters and/or symbols) and an associated data entry (e.g., gift card balance) having a value (e.g., the value of the remaining balance). An invalid database 214B stored by data repository 214 (and/or by another storage device) stores records of invalid serial codes (e.g., expired gift card numbers, cancelled gift card numbers, gift card numbers that were never used, and/or gift card numbers associated with a zero or near zero balance) and an associated data entry (e.g., gift card balance) having an invalid value (e.g., a generated value of the remaining balance that is invalid for redemption, i.e., a simulate value that has no real monetary equivalent).

It is noted that active database 214A and invalid database 214B may be stored and/or managed as independent databases. Active database 214A and invalid database 214B may be stored on a common data storage device (e.g., data repository 214) and/or on different data storage devices. For example, active database 214A may be locally stored on computing device 204, and invalid database 214B may be remotely stored on a remote server which is accessed by computing device 204 over a network and/or via a dedicated interface.

Alternatively or additionally, active database 214A and invalid database 214B are integrated and/or stored and/or managed as a single database. The single database data structure may include records having an indication (e.g., flag, metadata tag, data field) of whether the serial code and value of the data field is active or invalid.

Computing device 204 provides services to client terminal(s) 210 for checking the value of the data entry (e.g., gift card balance) for a given serial code (e.g., gift card serial number), for example, via web browser code 216A (e.g., stored in a data repository 216) of client terminal 210 presenting a GUI when accessing computing device 204 over network 208, for example, accessing a web site hosted by a server implementation of computing device 204. Code 206A running on computing device 204 detects fraudulent attempt(s) at obtaining authorized data by client terminal, for example, by malicious code 212A executing an automated brute force attack to identify active serial codes (e.g., gift card serial numbers) having active values (e.g., non-zero balances).

Alternatively in another architectural implementation, one or more portions of code 206A may be executed by another computing device (shown as validation server 222) in communication with computing device 204 over network 208 and/or over another secure communication channel (e.g., direct link and/or private network).

Computing device 204 may remotely access validation server 222 over network 208 optionally when no match is found between the serial code received from client terminal 210, for example, using an application programming interface (API), software development kit (SDK), script, or other code instructions. Validation server 222 may locally store and/or be associated with a storage device storing invalid database 214B (i.e., in such implementation computing device 204 does not store and/or manage invalid database 214B). Validation server 222 may look-up the serial code received from computing device 204 in invalid database 214B, and provide the invalid value to computing device 204. In this manner, validation server 222 may provide remote services (e.g., software as a service) to multiple computing devices 204 without necessarily requiring computing devices 204 to install code 206A thereon and/or without computing devices 204 to store and/or manage invalid database 214B.

Computing device 204, and client terminal(s) 210 may communicate with one another over network 208 using respective network interfaces, for example, one or more of: a network interface card, a wireless interface to connect to a wireless network, a physical interface for connecting to a cable for network connectivity, a virtual interface implemented in software, network communication software providing higher layers of network connectivity, and/or other implementations.

Exemplary networks 208 include: the internet, a virtual network, a wireless network, a cellular network, a public network, a private network, a direct link (e.g., cable, wireless) and/or indirect link (e.g., via an intermediary computing unit such as a server, and/or via a storage device), or other implementations.

Computing device 204 may be implemented as, for example, a client terminal, a server, a computing cloud, a virtual server, and a virtual machine.

Client terminal(s) 210 may be implemented as, for example, a mobile device, a desktop computer, a thin client, a Smartphone, a Tablet computer, a laptop computer, a server, a computing cloud, a wearable computer, glasses computer, and a watch computer.

Hardware processor(s) 202 of computing device 204 and/or hardware processor(s) 218 of client terminal(s) 210 may be implemented as, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 and/or 218 may include one or more processors (homogenous or heterogeneous), which may be arranged for parallel processing, as clusters and/or as one or more multi core processing units.

Data storage devices 206 and/or 212 store code instructions implementable by respective hardware processor(s) 202 and/or 218, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Data repositories 214 and/or 216 may be implemented as, for example, a memory, a local hard-drive, a removable storage unit, an optical disk, a storage device, and/or as a remote server and/or computing cloud (e.g., accessed using a network connection).

Computing device 204, and/or client terminal(s) 210 include and/or are in communication with a respective user interface 220A-B that includes a mechanism for entering values (e.g., entering the serial code) and/or a mechanism for viewing data (e.g., the value associated with the serial code). Exemplary user interfaces 220A-B include, for example, one or more of, a touchscreen, a display, a keyboard, a mouse, and voice activated software using speakers and microphone. User interface 220A-B may include graphical user interface (GUI) code as an implementation of the mechanism for entering data and/or viewing data.

Referring now to act 102 of FIG. 1, computing system 204 (optionally a web server) receives from client terminal 210 via network 208, a serial code and a request to obtain an associated value.

The serial code may include numbers, and/or alphabet characters, and/or symbols (e.g., found on a keyboard, and/or defined by a standard). The alphabet characters may be in one or more languages. The serial code may be entered directly into the interface of computing system 204, for example, by a user manually typing the serial code into a data field of the interface, and/or malicious code automatically entering the serial code into the data field. The serial code may be converted from another code, for example, a bar code and/or quick response (QR) code may be scanned from a physical object (e.g., plastic card, paper with the code printed thereon), by a laser scanner and/or by a camera of a smartphone.

The serial code may be entered into an unsecure and/or publicly available interface of computing system 204, for example, a web page, and/or a locally installed application.

The serial codes, which is unsecure and/or publicly available, may be prone to attack by malicious code 212A, which may issue a large number of request using different serial codes, for example, randomly generated serial numbers and/or serial numbers entered sequentially (e.g., incrementing each entered serial number by one). The large number of requests are automatically generated and entered in an attempt to identify which serial codes are still active and have an associated active value, for example, which serial numbers have associated non-zero balances. The non-zero balances may be transferred to an account of the malicious entity, and/or redeemed.

Exemplary serial codes include: gift card serial number, gift card PIN, and a voucher code. The term serial code may refer to a set of one or more serial codes, for example, a gift card serial number and a gift card PIN. An exemplary data field includes the remaining balance of the gift card. An exemplary value stored in the data filed includes the value of the remaining balance, for example, in terms of dollars, points, or other redeemable units and/or other monetary equivalent units.

At 104, computing device 204 accesses active database 214A storing active records of serial codes, each associated with the data field storing an active value. For example, active database 214A stores active gift card serial numbers with non-zero (and/or significant value, for example, over 10 cents, over 25 cents, over $1) balances. The value of the gift cards is redeemable (e.g., to purchase a product at the stored that issued the gift card) and/or transferrable into another account.

The received serial code is searched to identify a matching active serial code in active database 214A, for example, using a query function, a look-up function, and/or another database function.

Active database 214A is secure and private (i.e., not directly available to the public). Client terminal 210 is unable to directly access and/or search active database 214A. Computing device 204 may access and/or query active database 214A, for example, using a secure interface and/or secure connection and/or private interface and/or private connection.

It is noted that active database 214A is accessed for each received serial code, regardless of whether the serial code is active or whether the serial code is inactive, and regardless of whether the associated value is active or whether the associated value is inactive. Unlike in honeypot based security systems, no bait is used, and there is no deception designed for a malicious entity. Acts 102 and 104 are executed in a common manner, regardless of whether the computing device is being used by a legitimate user or whether the computing device is being used by malicious code.

At 106, when no match is found between the received serial code and the active serial codes stored in active database 214A, computing device 204 accesses invalid database 214B storing records of invalid serial codes each associated with an invalid value. Alternatively, computing device 204 accesses validation server 222 managing invalid database 214B locally stored by validation server 222, for example, via a secure interface over network 208 (e.g., API, SDK, virtual private network, encrypted channel).

Exemplary invalid serial codes may include: expired gift card serial numbers, gift card serial numbers associated with zero balances (or near zero balances, for example, below 5, 10, 25, 50, or 100 centers), and gift cards tagged as invalid (e.g., reported as lost and/or stolen).

Exemplary invalid values are fake values designed to be indistinguishable from active values. For example, the distribution of fake values may be selected to correspond to a distribution of active values. For example, a gift card having an actual balance of 3 cents is stored as having a fake balance of $95.

The invalid values include fake values that appear to be significant, for example, significantly greater than zero, for example, above about $10, or $20, or $50, or $100, or other values. The invalid values may include fake values that appear to be significant enough for redemption on a full product and/or service, for example, offered by the merchant that issued the gift card.

Invalid database 214B is secure and private (i.e., not directly available to the public). Client terminal 210 is unable to directly access and/or search active database 214A. Computing device 204 may access and/or query invalid database 214B, for example, using a secure interface and/or secure connection and/or private interface and/or private connection.

At 108A, the received serial code is searched to identify a matching invalid serial code in invalid database 214B, for example, using a query function, a look-up function, and/or another database function.

At 108B, when no match is found between the received serial code and the invalid serial codes stored in invalid database 214B, an invalid value is generated. The invalid value may be generated, for example, randomly, from a set of predefined values, selected from a distribution function that models the distribution of values stored by active values of active serial codes, and/or based on a random selection of an active value of an active serial code. For example, the invalid value may be generated based on the average of the active values stored in active database 214A.

A new record is created and stored in invalid database 214B. The new record includes the received serial code and the generated invalid value.

When the serial code is received again as another request to obtain the value (as in act 102) for example, from the same client terminal and/or another client terminal and/or other malicious code, the generated invalid value stored in invalid database 212B is provided in response.

At 110, the invalid value (which may be the stored value as in 108A or the generated value as in 108B) stored in association with the matched invalid serial code is provided to client terminal 210 over network 208. For example, the invalid value is transmitted as a network message (e.g., packet(s)) over network 208 and presented within a GUI on the display of client terminal 210, and/or transmitted to malicious code 212A running on client terminal 210.

It is noted that in comparison to standard practice, in which an error message indicating that the serial code is invalid, and/or in which a zero (or close to zero) balance is provided, and/or in which a message indicative that the balance is exhausted, the systems, methods, and/or code instructions described herein provide the invalid value to client terminal 210.

The invalid value is provided to client terminal 210 via network 208 in a format that is indistinguishable to client terminal 210 from a provided active value. For example, the invalid value is transmitted in a similar manner as an active value is transmitted, for example, within a similar packet structure, within a similar interface, and/or presented within a similar GUI. For example, the invalid value is structurally similar to an active value in terms of pattern of letter and/or numbers and/or symbols.

By providing the client terminal with fake values in response to requests with invalid serial codes, the malicious code is unable to distinguish the real active serial code from the invalid serial code, and therefore unable to utilize the active balances, protecting the values associated with the active serial codes. For example, when the malicious code includes instructions to identify active gift card serial numbers with non-zero balances and transfer the non-zero balances to another account, but the instead the malicious code receives invalid balances for the inactive gift card serial numbers, the malicious code may become overwhelmed in trying to transfer invalid balances from invalid serial codes and/or transfer balances of zero.

At 112, optionally an alert indicative of client terminal 210 identified as associated with malicious behavior is generated (e.g., by computing device 204). For example, the alert may be transmitted as a message to an administrator (e.g., as an email, as a pop-up message, as an alert on a monitoring GUI), the alert may be transmitted to another server for further investigation (e.g., server of the merchant that issued the gift card, authorities), and/or the alert may trigger security code to protect against malicious behavior by the client terminal 210 (e.g., block client terminal 210 from accessing computing device 204).

At 114, blocks 102-112 are iterated in response to repeated requests, for example, serial codes are automatically repeatedly provided by malicious code 116 executing on client terminal 210 performing a brute-force attack.

The sequence of repeated requests may be identified and additional requests ignored, and/or client terminal 210 is blocked and prevented from accessing computing device 204. The sequence of repeated requests may be identified according to sequentially related serial codes, for example, gift card serial numbers that are incrementally increased by one or another value. The repeated requests may be identified according to a high rate of the incoming requests (which are indicative of an automated attack), and/or as originating from a common source (e.g., same IP address).

At 116, alternatively to executing 106, when a match is found during execution of act 104 between the received serial code and active serial codes stored in active database 214A, the active value stored in association with the matched active serial code is provided to client terminal 210.

It is noted that when a legitimate user enters their serial code (e.g., active gift card), the current remaining value (e.g., balance) is provided. When malicious code 212A is executing a brute-force attack, even when an active serial code is provided within a sequence of invalid serial codes, and the active value is returned, malicious code 212A is unable to distinguish the real value(s) from the fake responses, and therefore, unable to redeem or transfer the real value(s). In this manner, the balance inquiry service is maintained for real users, while protecting their active balances from attacks.

Figure 3:
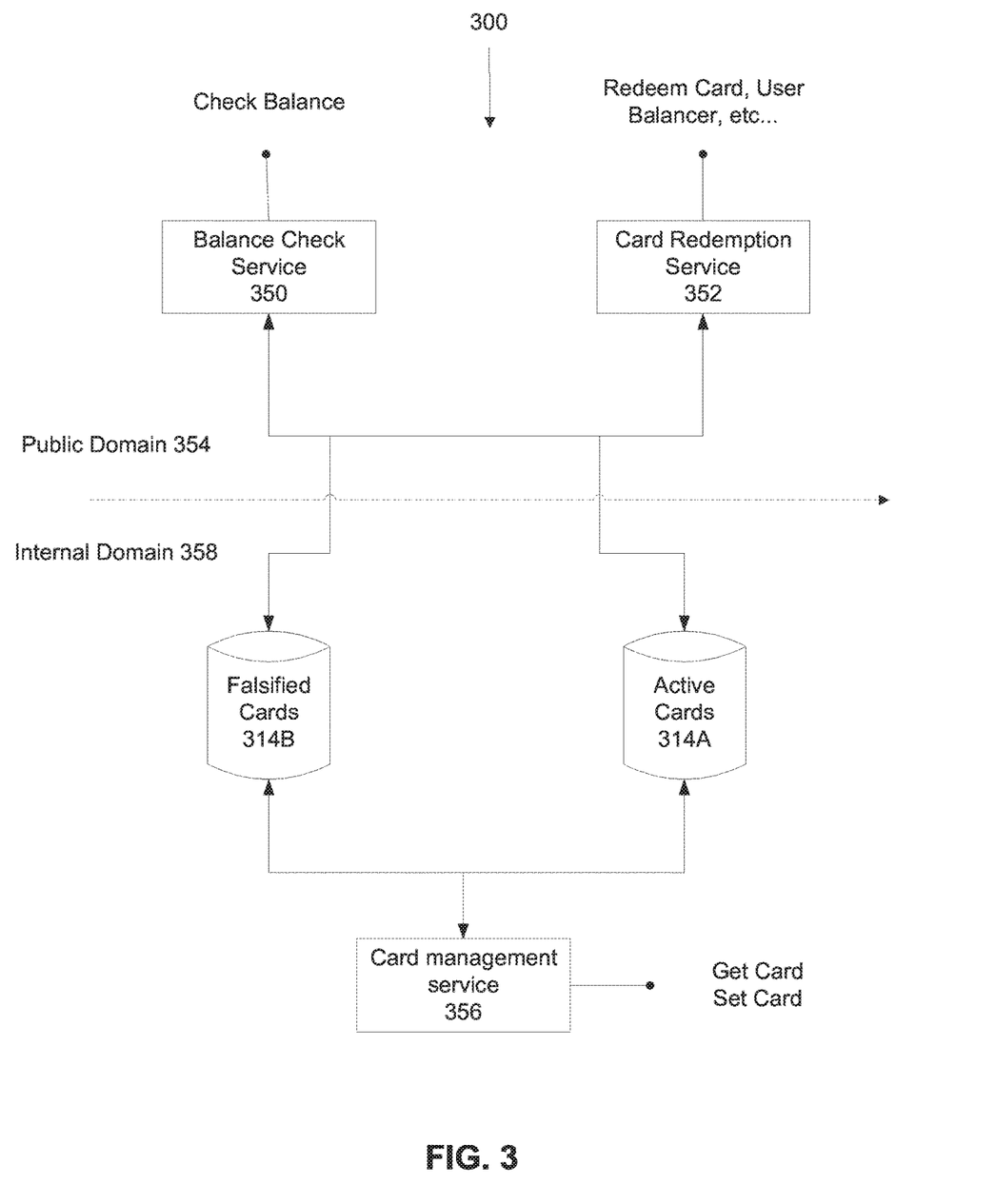
FIG. 3 is a block diagram of another implementation of a system for detecting fraudulent use of a gift card serial code for accessing a balance stored on a network by providing an invalid balance when invalid gift card serial code(s) are provided, in accordance with some embodiments of the present invention.

Reference is now made to FIG. 3, which is block diagram of another implementation of a system 300 for detecting fraudulent use of a gift card serial code for accessing an associated value stored on a network by providing an invalid balance when invalid gift card serial codes are provided, in accordance with some embodiments of the present invention. System 300 may include and/or be integrated with one or more components of system 200 described with reference to FIG. 2.

Features and/or components described with reference to system 300 may be provided by a server (e.g., computing device 204 described with reference to FIG. 2) executing code instructions (e.g., code 206A) stored in a data storage device (e.g., 206) in response to one or more queries issued by a client terminal (e.g., 210) over a network (e.g., 208).

A balance check service 350 (e.g., implemented as code instructions stored in a data storage device executable by one or more hardware processors of the server) provides a check balance service to the client terminal, returning invalid values in response to invalid gift card serial numbers, as described herein. For example, balance check service 350 is implemented as a web site that presents the value of the balance in response to an entered gift card serial number.

A card redemption service 352 (e.g., implemented as code instructions stored in a data storage device executable by one or more hardware processors of the server) provides the user using client terminal with the ability to redeem the balance on the gift card, and/or transfer the balance to another gift card and/or another account.

It is noted that an automated malicious process (e.g., bot) that executes a brute-force attack on balance check service 350 by issuing multiple requests to obtain a balance of generated gift card numbers with the goal of identifying active gift cards with non-zero balances, is prevented from using card redemption service 352 to redeem and/or transfer balances. As discussed herein, since the bot is unable to determine the fake balances from real balances, the bot is unable to determine which gift card serial numbers are active from the invalid gift card serial numbers.

Balance check service 350 and card redemption service 352 are in a public domain 354, which is unsecured and/or may be accessible by different client terminals. As such, balance check service 350 is prone to attacks by malicious code (e.g., bot executing brute-force attacks), as described herein. The systems, methods, and/or code instructions described herein provide security for active balances of active gift card serial numbers while providing the balance check service 350 in an unsecure and publicly environment.

An active card database 314A stores records of active gift card serial numbers and the active balances. A falsified cards database 314B stores records of falsified (i.e., invalid) gift card serial numbers and fake (i.e., invalid) balances. As described herein, when a gift card serial number is received from a client terminal and is not found in active card database 314A, the invalid balance found in falsified cards database 314B is provided (or an invalid balance is generated and provided, and stored as a new entry in falsified cards database 314B).

A card management service 356 manages active card database 314A and falsified card database 314B according to the current state of the gift card, for example, a record of a gift card that expired and/or whose balance has been depleted is moved from active card database 314A to falsified card database 314B.

Active cards database 314A, falsified cards database 314B, and card management service 356 are stored in an internal domain 358, which is private and/or secure, and cannot be directly accessed and/or searched by external entities such as client terminals.

Figure 4:
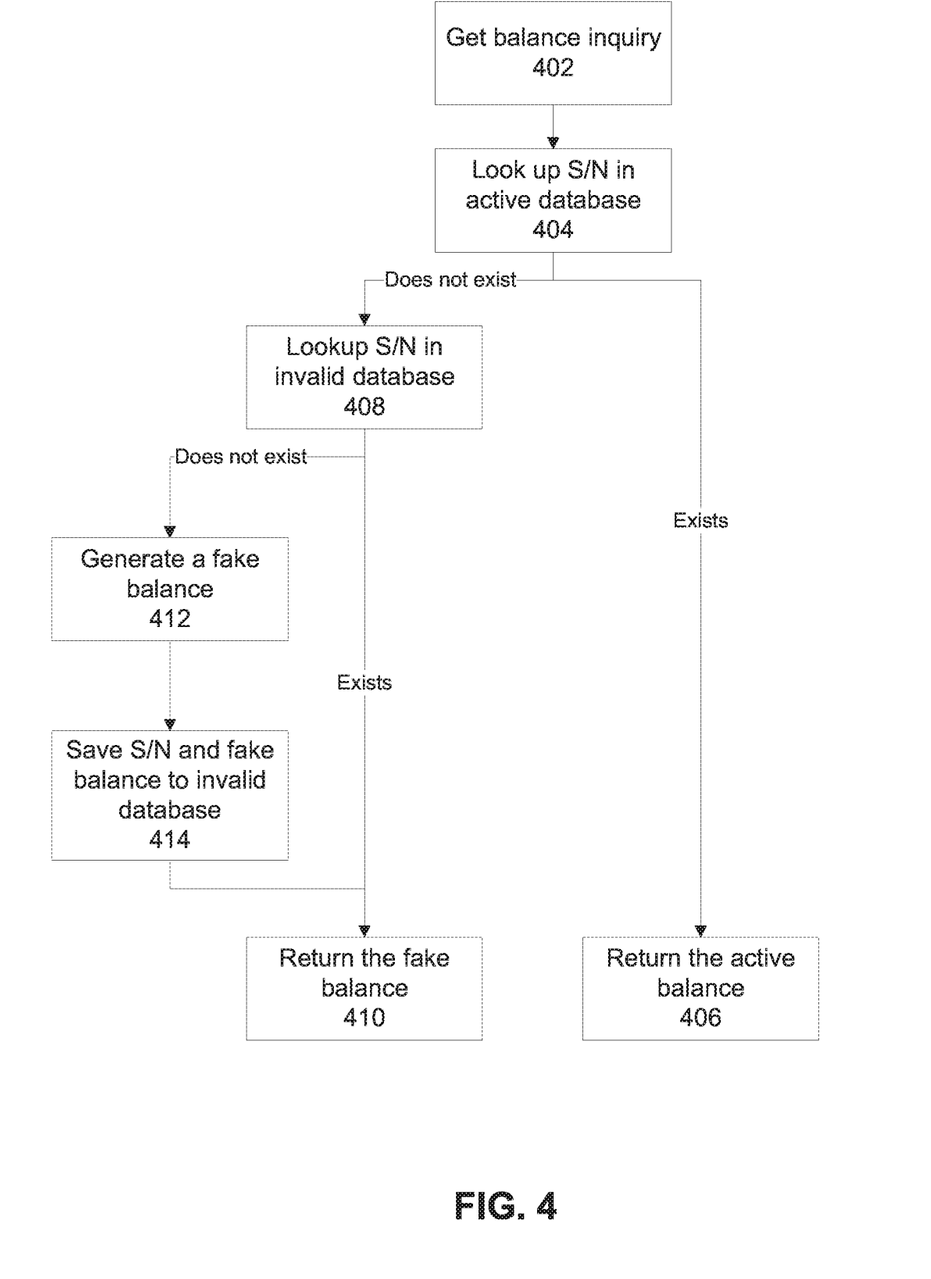
FIG. 4 is a flowchart of an implementation of another process of detecting fraudulent use of a gift card serial number(s) for accessing an associated balance by providing an invalid balance when invalid gift card serial numbers are provided, in accordance with some embodiments of the present invention.

Reference is now made to FIG. 4, which is a flowchart of an implementation of another process of detecting fraudulent use of a gift card serial number(s) for accessing an associated balance by providing an invalid balance value when invalid gift card serial numbers are provided, in accordance with some embodiments of the present invention.

At 402, a balance inquiry is received at a computing device (optionally a server) from a client terminal over a network, for example, via a web site hosted by the server. A serial number (S/N) of a gift card is provided for looking up the associated balance.

At 404, the S/N is looked-up in an active database storing records of active gift cards and associated balances.

At 406, when a match is found in the active database, the active balance is returned to the client terminal, for example, presented on a display of the client terminal, such as within a GUI and/or within the web page.

Alternatively, at 408, when no match is found in the active database, the S/N is looked-up in an invalid database storing invalid gift card S/Ns and invalid balances.

At 410, when a match is found in the invalid database, the fake balance is returned to the client terminal.

Alternatively, at 412, when a match is not found in the active database, a fake balance is generated.

At 414, the received gift card S/N and generated fake balance are saved as a new record in the invalid database. At 410, the generated fake balance is provided to the client terminal.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant serial codes and data entries will be developed and the scope of the terms serial code and data entries are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of detecting fraudulent use of a gift card serial code at a client terminal during an automated gift card bot attack, comprising:
   by a computing system:
   receiving by a computing system, from the client terminal via a network, a serial code and a request to obtain a value associated with the serial code,
   wherein the serial code includes a gift card serial number, and wherein the value includes a remaining balance associated with the gift card serial number;
   accessing a first database storing a plurality of valid serial codes each associated with a valid value;
   wherein the first database is accessed for each received serial code;
   when no match is found between the received serial code and the plurality of valid serial codes stored in the first database:
      accessing a second database storing a plurality of invalid serial codes each associated with a unique invalid value,
      generating a unique invalid value for the received serial code in the second database that matches a structural format of a valid value of a valid serial code of the first database, the matching structural format including a pattern of at least one of: letters, numbers, and symbols;
      wherein the unique invalid value is generated according to at least one member of the group consisting of:
      a random selection of a valid value of a valid serial code stored in the first database,
      an average of valid values of valid serial codes stored in the first database, and
      a value selected from a distribution function that models a distribution of valid values of valid serial codes stored in the first database, pairing the received serial code to the generated unique invalid value, and storing a new record in the second database including the paired received serial code and the generated unique invalid value; and providing, to the client terminal via the network, the unique invalid value paired with the received serial code when a match is found between the received serial code and a unique valid serial code of the plurality of valid serial codes stored in the first database, providing, to the client terminal via the network, the valid value paired with the valid serial code stored in the first database;

identifying a sequence of requests provided by the client terminal;

detecting a brute-force attack based on at least one member of the group consisting of: a plurality of sequentially related serial codes that are incrementally increased for each request, and a rate of incoming requests per unit time above a threshold which is indicative of an automated attack;

blocking additional requests from the client terminal; and releasing at least one of: processing resources, memory resources, and network resources, allocated to processing the requests from the client terminal.

2. The computer implemented method of claim 1, wherein an interface of the computing device for receiving the request and the serial code is unsecure and publicly accessible to valid users and to malicious entities for issuing requests to obtain the value of the remaining balance associated with the received serial code.

3. The computer implemented method of claim 1, wherein an interface of the computing device for accessing the first database and the second database is secure, unavailable to public entities, and inaccessible directly by the client terminal.

4. The computer implemented method of claim 1, wherein the first database and the second database are stored and managed as independent databases.

5. The computer implemented method of claim 1, wherein the generated unique invalid value is provided to the client terminal rather than an error message indicative of invalidity of the serial code.

6. The computer implemented method of claim 1, further comprising generating an alert indicative of the client terminal initiating the detected brute-force attack, and transmitting the alert to a server.

7. The computer implemented method of claim 1, wherein the sequentially related received serial codes include gift card serial numbers incrementally related to one another by a common value.

8. The computer implemented method of claim 1, wherein the sequence of requests are automatically provided by an automated malicious process executing on the client terminal performing the brute-force attack for identifying serial codes with associated valid values.

9. A system for detecting fraudulent use of a gift card serial code at a client terminal during an automated gift card bot attack, comprising:

a non-transitory memory having stored there a code for execution by at least one hardware processor of a computing system, the code comprising code for:

receiving by a computing system, from the client terminal via a network, a serial code and a request to obtain a value associated with the serial code, accessing a first database storing a plurality of valid serial codes each associated with a valid value;

wherein the first database is accessed for each received serial code;

determining when no match is found between the received serial code and the plurality of valid serial codes stored in the first database:

accessing a second database storing a plurality of invalid serial codes each associated with a unique invalid value;

generating a unique invalid value for the received serial code in the second database that matches a structural format of a valid value of a valid serial code of the first database, the matching structural format including a pattern of at least one of: letters, numbers, and symbols;

wherein the unique invalid value is generated according to at least one member of the group consisting of:

a random selection of a valid value of a valid serial code stored in the first database, an average of valid values of valid serial codes stored in the first database, and a value selected from a distribution function that models a distribution of valid values of valid serial codes stored in the first database, pairing the received serial code to the generated unique invalid, and storing a new record in the second database including the paired received serial code and the generated unique invalid value; and providing, to the client terminal via the network, the unique invalid value paired with the received serial code, when a match is found between the received serial code and a unique valid serial code of the plurality of valid serial codes stored in the first database, providing, to the client terminal via the network, the valid value paired with the valid serial code stored in the first database;

identifying a sequence of requests provided by the client terminal;

detecting a brute-force attack based on at least one member of the group consisting of: a plurality of sequentially related serial codes that are incrementally increased for each request, and a rate of incoming requests per unit time above a threshold which is indicative of an automated attack;

blocking additional requests from the client terminal; and releasing at least one of: processing resources, memory resources, and network resources, allocated to processing the requests from the client terminal.

10. The system of claim 9, wherein the code for accessing the second database and the code for matching the received serial code to the unique invalid serial code is stored by a second non-transitory memory for execution by another at least one hardware processor of a validation server, wherein the computing device accesses the validation server by a secure interface over the network.

11. A computer program product for detecting fraudulent use of a gift card serial code at a client terminal during an automated gift card bot attack, comprising:

a non-transitory memory having stored there a code for execution by at least one hardware processor of a computing system, the code comprising instructions for:

receiving by a computing system, from the client terminal via a network, a serial code and a request to obtain a value associated with the serial code,
wherein the serial code includes a gift card serial number, and wherein the value includes a remaining balance associated with the gift card serial number;
accessing a first database storing a plurality of valid serial codes each associated with a valid value;
wherein the first database is accessed for each received serial code;
determining when no match is found between the received serial code and the plurality of valid serial codes stored in the first database:
  accessing a second database storing a plurality of invalid serial codes each associated with a unique invalid value,
  generating a unique invalid value for the received serial code in the second database that matches a structural format of a valid value of a valid serial code of the first database, the matching structural format including a pattern of at least one of: letters, numbers, and symbols;
  wherein the unique invalid value is generated according to at least one member of the group consisting of:
    a random selection of a valid value of a valid serial code stored in the first database,
    an average of valid values of valid serial codes stored in the first database, and
    a value selected from a distribution function that models a distribution of valid values of valid serial codes stored in the first database, and
  pairing the received serial code to the generated unique invalid value, and
  storing a new record in the second database including the paired received serial code and the generated unique invalid value; and
  providing, to the client terminal via the network, the unique invalid value paired with the received serial code,
when a match is found between the received serial code and a unique valid serial code of the plurality of valid serial codes stored in the first database, providing, to the client terminal via the network, the valid value paired with the valid serial code stored in the first database;
identifying a sequence of requests provided by the client terminal;
detecting a brute-force attack based on at least one member of the group consisting of: a plurality of sequentially related serial codes that are incrementally increased for each request, and a rate of incoming requests per unit time above a threshold which is indicative of an automated attack;
blocking additional requests from the client terminal; and
releasing at least one of: processing resources, memory resources, and network resources, allocated to processing the requests from the client terminal.

* * * * *